(12) United States Patent  
Sung et al.

(10) Patent No.: US 10,198,639 B2
(45) Date of Patent: *Feb. 5, 2019

(54) SYSTEM AND METHOD FOR PROVIDING IMAGE INFORMATION AROUND VEHICLE

(71) Applicant: Hyundai Motor Company, Seoul (KR)

(72) Inventors: Kap Je Sung, Gyeonggi-do (KR); Jun Sik An, Gyeonggi-do (KR); Joong Ryoul Lee, Incheon (KR)

(73) Assignee: Hyundai Motor Company, Seoul (KR)

( * ) Notice: Subject to any disclaimer, the term of this patent is extended or adjusted under 35 U.S.C. 154(b) by 236 days.

This patent is subject to a terminal disclaimer.

(21) Appl. No.: 15/193,267

(22) Filed: Jun. 27, 2016

(65) Prior Publication Data

US 2017/0161566 A1 Jun. 8, 2017

(30) Foreign Application Priority Data

Dec. 8, 2015 (KR) ........................ 10-2015-0174327

(51) Int. Cl.
*H04N 7/18* (2006.01)
*G06K 9/00* (2006.01)
(Continued)

(52) U.S. Cl.
CPC ............ *G06K 9/00791* (2013.01); *B60R 1/00* (2013.01); *H04N 5/2258* (2013.01);
(Continued)

(58) Field of Classification Search
CPC ...... H04N 7/18; H04N 5/232; H04N 5/23238; H04N 5/23293; G06K 9/00; G06K 9/00791; B60R 1/00; B60R 25/1012; B60R 2300/802; B60R 2300/205; B60R 2300/105
(Continued)

(56) References Cited

U.S. PATENT DOCUMENTS 9,168,869 B1 * 10/2015 Kamal .................. H04N 7/18
9,199,607 B2 * 12/2015 Ohta .................... B60R 25/1012
(Continued)

FOREIGN PATENT DOCUMENTS

JP 2003-219413 A 7/2003
JP 2013-078151 A 4/2013
(Continued)

*Primary Examiner* — Trang U Tran
(74) *Attorney, Agent, or Firm* — Mintz Levin Cohn Ferris Glovsky and Popeo, P.C.; Peter F. Corless

(57) ABSTRACT

A system for providing image information around a vehicle includes: an outside left camera and an outside right camera configured to photograph rear sides of the vehicle from a left outside position and a right outside position of the vehicle, respectively; a top view left camera, a top view right camera, a top view front camera, and a top view rear camera configured to photograph an outside area of the vehicle including a ground; and a controller configured to provide image data deriving from the outside left camera and the outside right camera to a outside left display and a outside right display, respectively, and to provide image data deriving from the top view left camera, the top view right camera, the top view front camera, and the top view rear camera to a head unit display-mirror.

17 Claims, 10 Drawing Sheets

(51) Int. Cl.
  *B60R 1/00*   (2006.01)
  *H04N 5/232*  (2006.01)
  *H04N 5/225*  (2006.01)
  *H04N 5/247*  (2006.01)

(52) U.S. Cl.
  CPC ..... *H04N 5/23238* (2013.01); *H04N 5/23254* (2013.01); *H04N 5/23293* (2013.01); *H04N 5/247* (2013.01); *B60R 2300/105* (2013.01); *B60R 2300/205* (2013.01); *B60R 2300/207* (2013.01); *B60R 2300/70* (2013.01); *B60R 2300/802* (2013.01)

(58) Field of Classification Search
  USPC ......................................................... 348/148
  See application file for complete search history.

(56) References Cited

U.S. PATENT DOCUMENTS

| | | | |
|---|---|---|---|
| 9,762,880 B2 * | 9/2017 | Pflug | G06T 15/20 |
| 2016/0101734 A1 * | 4/2016 | Baek | B60R 1/00 |
| | | | 348/148 |
| 2017/0136948 A1 * | 5/2017 | Sypitkowski | B60R 1/00 |
| 2017/0232896 A1 * | 8/2017 | Bassi | B60R 1/00 |
| | | | 348/148 |

FOREIGN PATENT DOCUMENTS

| | | |
|---|---|---|
| KR | 10-0439021 B1 | 7/2004 |
| KR | 2011-0045940 A | 5/2011 |
| KR | 10-1339121 B1 | 12/2013 |

\* cited by examiner

| FAILURE OR NOT | LEFT DISPLAY 141 | HEAD UNIT DISPLAY 145 | RIGHT DISPLAY 142 |
|---|---|---|---|
| NORMAL | VIEW CONVERSION IMAGE OF LEFT OUTSIDE CAMERA | SYNTHESIS IMAGE OF TOP VIEW CAMERA | VIEW CONVERSION IMAGE OF RIGHT OUTSIDE CAMERA |
| FAILURE OF OUTSIDE CAMERA | VIEW CONVERSION IMAGE OF LEFT TOP VIEW CAMERA | SYNTHESIS IMAGE OF TOP VIEW CAMERA | VIEW CONVERSION IMAGE OF RIGHT TOP VIEW CAMERA |
| FAILURE OF OUTSIDE DISPLAY | N/A | VIEW CONVERSION IMAGES OF LEFT AND RIGHT OUTSIDE CAMERAS | N/A |
| FAILURE OF OUTSIDE CAMERA & DISPLAY | N/A | VIEW CONVERSION IMAGES OF LEFT AND RIGHT TOP VIEW CAMERA | N/A |
| FAILURE OF CONTROLLER | ORIGINAL IMAGE OF LEFT OUTSIDE CAMERA | | ORIGINAL IMAGE OF RIGHT OUTSIDE CAMERA |

FIG. 4

SYSTEM AND METHOD FOR PROVIDING IMAGE INFORMATION AROUND VEHICLE

CROSS-REFERENCE TO RELATED APPLICATION

This application is based on and claims the benefit of and priority to Korean Patent Application No. 10-2015-0174327, filed on Dec. 8, 2015 in the Korean Intellectual Property Office, the disclosure of which is incorporated herein in its entirety by reference.

TECHNICAL FIELD

The present disclosure relates generally to a system and a method for providing image information, and more particularly, to a system and a method for providing image information around a vehicle to a driver in situations in which the vehicle is driven and parked.

BACKGROUND

In order to prevent vehicular accidents occurring due to a blind spot or "dead zone" around a vehicle, a front and rear view camera and an around view monitor (AVM) for monitoring the surroundings of the vehicle have been recently installed in vehicles. In addition, cameras capable of replacing an outside mirror for the purpose of improving fuel efficiency in addition to removing the dead zone have been actively developed.

For example, in some vehicles, narrow angle cameras are mounted at left and right sides outside of both doors of the vehicle instead of the outside mirror, and the cameras output a camera image to displays mounted at left and right sides inside of the vehicle. However, conventional systems for providing image information around the vehicle have problems in that when the camera or the display fails, the failed camera or display may interfere with the driving of the vehicle. Since the left and right cameras, which are the narrow angle cameras, provide narrow angle images for the rear side of the vehicle, an amount of viewed ground is small, and as a result, it is difficult to sufficiently monitor the dead zone.

In addition, a wide angle four-channel AVM camera can be installed in a vehicle to provide a top view. However, such system has problems in that when some components such as the camera and the like fail, the failed component may interfere with the driving of the vehicle, and sufficient image quality of the outside of the vehicle is not provided.

SUMMARY

The present disclosure has been made to solve the above-mentioned problems occurring in the related art while advantages achieved by the related art are maintained intact.

An aspect of the present disclosure provides a system and a method for providing image information around a vehicle capable of achieving excellent image quality and an increased amount of viewed ground and maintaining a monitoring function despite a failure occurrence of some cameras or displays by integrating a narrow angle camera (e.g., an e-mirror camera) for image quality and a sense of distance and an around view monitor (AVM) camera for a wide angle image. Such a system can provide convenience and safety while driving the vehicle by providing the image information for monitoring the surroundings of the vehicle to a driver in situations in which the vehicle is driven and parked.

According to embodiments of the present disclosure, a system for providing image information around a vehicle includes: an outside left camera and an outside right camera configured to photograph rear sides of the vehicle from a left outside position and a right outside position of the vehicle, respectively; a top view left camera, a top view right camera, a top view front camera, and a top view rear camera configured to photograph an outside area of the vehicle including a ground from a front position, a rear position, a left position, and a right position outside of the vehicle, respectively; an outside left display and an outside right display installed at a left position and a right position, respectively, around a dash board inside of the vehicle, and a head unit display installed at a head unit inside of the vehicle; and a controller configured to provide image data deriving from the outside left camera and the outside right camera to the outside left display and the outside right display, respectively, and to provide image data deriving from the top view left camera, the top view right camera, the top view front camera, and the top view rear camera to the head unit display.

The outside left display and the outside right display may directly receive the image data from the outside left camera and the outside right camera, respectively, depending on a failure occurrence of the controller.

The controller may be further configured to provide image data deriving from one or more cameras of a failure direction among the top view left camera and the top view right camera to one or more displays corresponding to the one or more cameras of the failure direction among the outside left display and the outside right display, depending on a failure occurrence of any of the outside left camera and the outside right camera.

The controller may be further configured to provide image data deriving from one or more cameras of a failure direction of a corresponding display among the outside left camera and the outside right camera to the head unit display, depending on a failure occurrence of any of the outside left display and the outside right display.

When any one of the outside left camera and the outside right camera fail, and any one of the outside left display and the outside right display fail, the controller may be further configured to provide image data deriving from a normally functioning outside camera to the corresponding normally functioning display of the outside left display and the outside right display, or provide the image data deriving from the normally functioning outside camera to the head unit display when there is no corresponding normally functioning display.

When both the outside left camera and the outside right camera fail, the controller may be further configured to provide image data deriving from the top view left camera and the top view right camera to the corresponding normally functioning display of the outside left display and the outside right display, or provide the image data deriving from the top view left camera and the top view right camera to the head unit display when there is no corresponding normally functioning display.

When both the outside left display and the outside right display fail, the controller may be further configured to provide image data deriving from a normally functioning outside camera to the head unit display, or provide image data deriving from the top view left camera and the top view right camera to the head unit display when there is no normally functioning outside camera.

The controller may be further configured to provide a view having an increased amount of viewed ground obtained by synthesizing an image of the outside left camera and an image of the top view left camera and provide a view having an increased amount of viewed ground obtained by synthesizing an image of the outside right camera and an image of the top view right camera, to the outside left display and the outside right display, respectively.

The controller may be further configured to provide images of all available directions deriving from the top view left camera, the top view right camera, the top view front camera, and the top view rear camera to the head unit display, and perform an image synthesis so that a predetermined rear region of the vehicle among the images of all available directions is replaced with images based on the outside left camera and the outside right camera.

Furthermore, according to embodiments of the present disclosure, a method for providing image information around a vehicle includes: photographing, by an outside left camera and an outside right camera, rear sides of the vehicle from a left outside position and a right outside position of the vehicle; photographing, by a top view left camera, top view right camera, a top view front camera, and a top view rear camera, an outside area of the vehicle including a ground from a front position, a rear position, a left position, and a right position outside of the vehicle, respectively; providing, by a controller, image data deriving from the outside left camera and the outside right camera to an outside left display and an outside right display, respectively, installed at a left position and a right position, respectively, around a dash board inside of the vehicle; and providing, by the controller, image data deriving from the top view left camera, the top view right camera, the top view front camera, and the top view rear camera to a head unit display installed at a head unit inside of the vehicle.

Furthermore, according to embodiments of the present disclosure, a non-transitory computer readable medium containing program instructions for providing image information around a vehicle includes program instructions that: provide image data deriving from an outside left camera and an outside right camera to an outside left display and an outside right display, respectively, installed at a left position and a right position, respectively, around a dash board inside of the vehicle; and provide image data deriving from a top view left camera, a top view right camera, a top view front camera, and a top view rear camera to a head unit display installed at a head unit inside of the vehicle. The outside left camera and the outside right camera are configured to photograph rear sides of the vehicle from a left outside position and a right outside position of the vehicle, respectively, and the top view left camera, the top view right camera, the top view front camera, and the top view rear camera are configured to photograph an outside area of the vehicle including a ground from a front position, a rear position, a left position, and a right position outside of the vehicle, respectively.

BRIEF DESCRIPTION OF THE DRAWINGS

The above and other objects, features and advantages of the present disclosure will be more apparent from the following detailed description taken in conjunction with the accompanying drawings.

FIG. 4 illustrates embodiments of a display state depending on whether or not a controller, cameras, or displays of FIG. 1 fail.

DETAILED DESCRIPTION OF THE EMBODIMENTS

Figure 1:
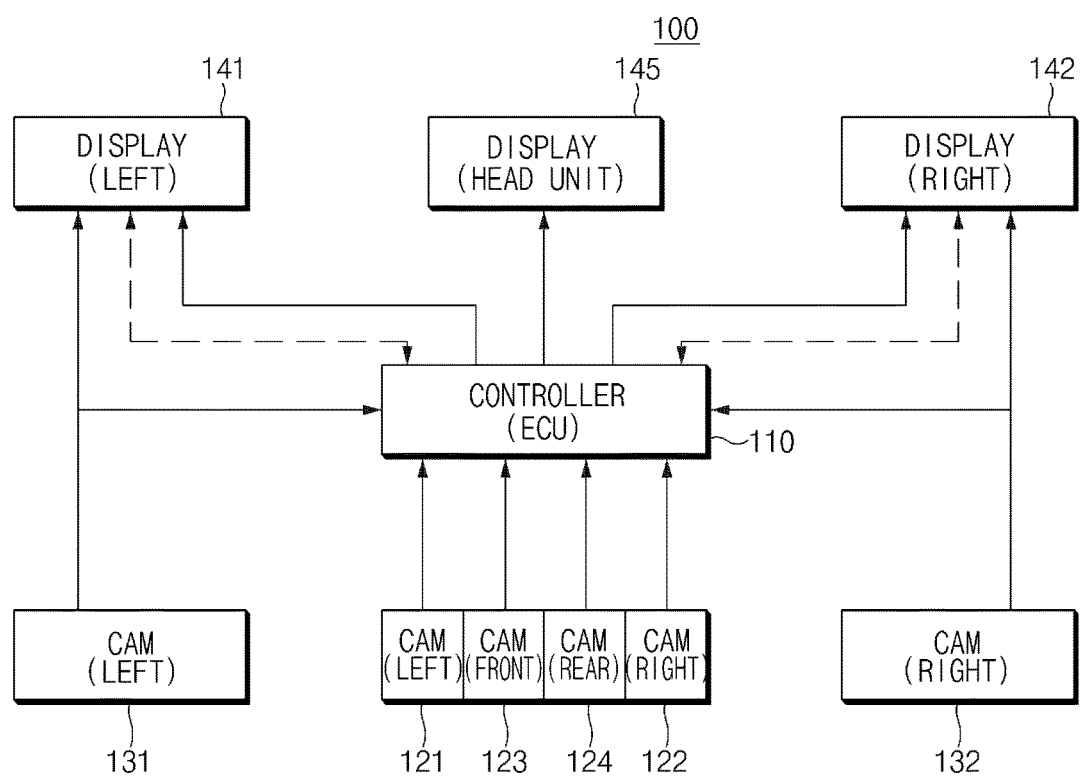
FIG. 1 is a view illustrating a system for providing image information around a vehicle according to embodiments of the present disclosure.

Hereinafter, the present disclosure will be described in detail with reference to the accompanying drawings. Here, like reference numerals denote like elements in the respective drawings. In addition, a detailed description of functions and/or configurations which are already known will be omitted. The contents disclosed below mainly describe portions necessary to understand operations according to various embodiments and a description of elements which may obscure the gist of the description will be omitted. In addition, some components shown in the drawings may be exaggerated, omitted or schematically illustrated. The size of each component does not exactly reflect its real size and accordingly, the contents described in this specification are not limited by relative sizes or intervals of the components illustrated in the respective drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the presently disclosed embodiments, FIG. 1 is a view illustrating a system 100 for providing image information around a vehicle according to embodiments of the present disclosure.

As shown in FIG. 1, the system 100 for providing image information around a vehicle according to embodiments of the present disclosure includes a controller 110 of an electronic control unit (ECU) type, top view cameras 121, 122, 123, and 124 configured to photograph directions including a ground from a front position, a rear position, a left position, and a right position outside of the vehicle, respectively, outside cameras 131 and 132 configured to photograph rear sides from a left position and a right position outside of the vehicle, respectively, a left display 141 and a right display 142 configured to be each installed at a left position and a right position, respectively, around a dash board inside of the vehicle, and a head unit display (or a room mirror display) 145 configured to be installed at a head unit inside of the vehicle. The controller 110 may be a semiconductor processor that performs a general control for the top view cameras 121, 122, 123, and 124, the outside cameras 131 and 132, and the displays 141, 142, and 145.

The top view cameras 121, 122, 123, and 124 (or around view monitor (AVM) cameras) include a top view left camera 121, a top view right camera 122, a top view front camera 123, and a top view rear camera 124, which may be the AVM cameras, and are implemented as a wide angle camera in order to provide a wide angle image obtained by looking down from a top position. The outside cameras 131 and 132 include an outside left camera 131 and an outside right camera 132, which may be an e-mirror camera for supporting an electronic mirror, and are implemented as a narrow angle camera in order to provide high image quality and a sense of distance.

Figure 2:
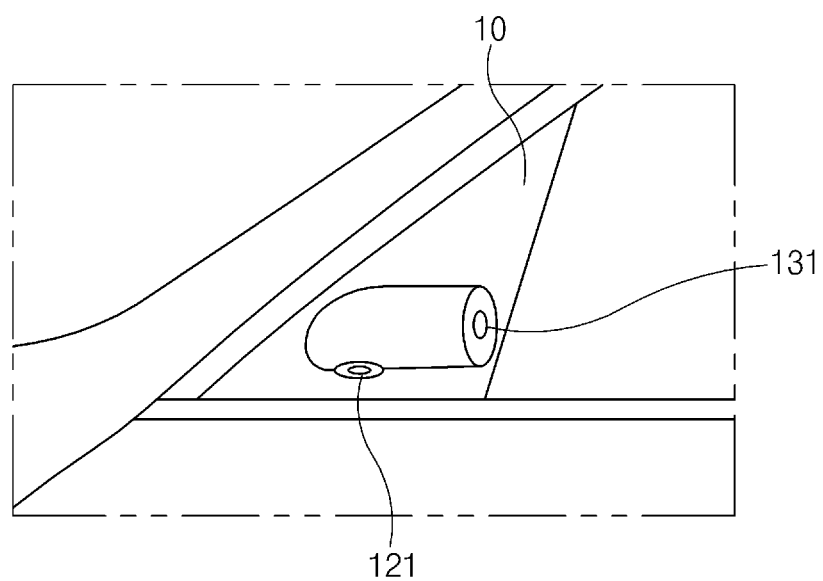
FIG. 2 is a view illustrating positions at which outside cameras and top view cameras of FIG. 1 are mounted.

FIG. 2 is a view illustrating positions at which the outside cameras 131 and 132 and the top view cameras 121, 122, 123, and 124 of FIG. 1 are mounted.

As illustrated in FIG. 2, the outside left camera 131 and the top view left camera 121 may be mounted in one housing installed around a left quadrant panel outside of the vehicle, wherein the outside left camera 131 may photograph a rear side of the vehicle from a left outside position of the vehicle, and the top view left camera 121 may photograph a direction looking down toward ground from the left outside position of the vehicle. Similarly, the outside right camera 132 and the top view right camera 122 may be mounted at a right outside position of the vehicle. In addition, the top view front camera 123 and the top view rear camera 124 may be appropriately installed at a front outside position and a rear outside position of the vehicle so as to photograph directions looking down or toward the ground from the front and the rear of the vehicle, respectively.

Figure 3:
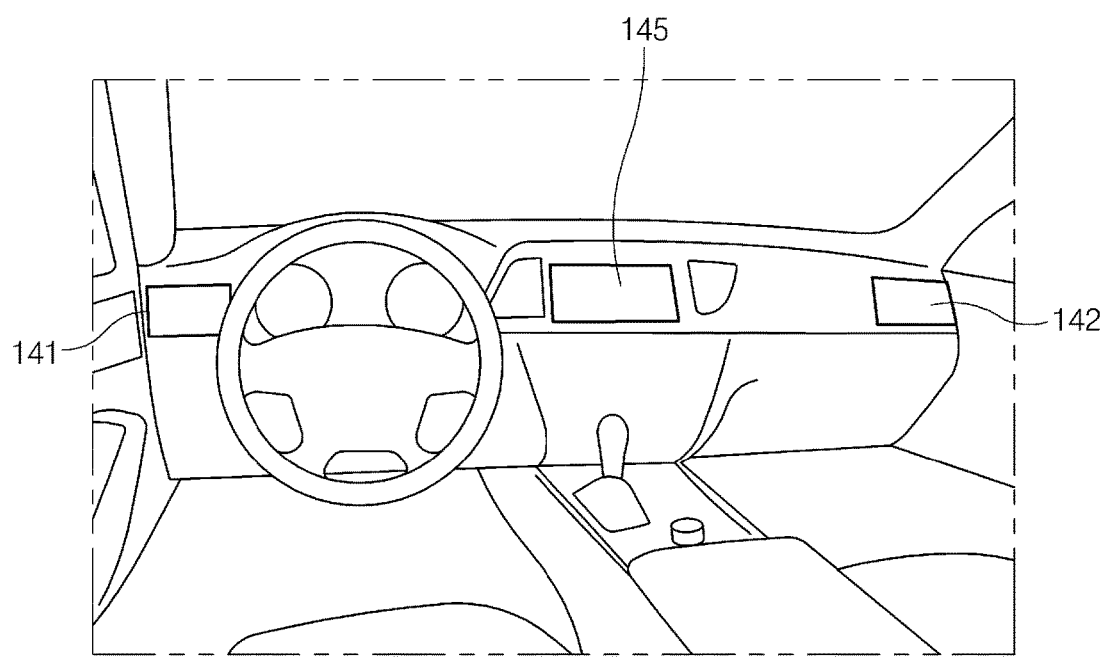
FIG. 3 is a view illustrating positions at which a left display, a right display, and a head unit display of FIG. 1 are mounted.

FIG. 3 is a view illustrating positions at which the left display 141, the right display 142, and the head unit display 145 of FIG. 1 are mounted.

As illustrated in FIG. 3, the left display 141 and the right display 142, which are to replace the outside mirror, are appropriately installed at left and right ends of a dash board inside of the vehicle and provide images deriving from the outside left camera 131 and the outside right camera 132, respectively, thereby making it possible to assist a driver to drive the vehicle while monitoring left and right rear sides.

The head unit display 145 may be installed at a head unit of the dash board inside of the vehicle, and may be a display of an audio video navigation (AVN) system. The head unit display 145 provides images deriving from the top view cameras 121, 122, 123, and 124, thereby making it possible to assist the driver to drive the vehicle while monitoring images of all portions or selected portions among the images (i.e., a left image, a right image, a front image, and a rear image) for all directions of the vehicle as if the driver looks down the vehicle from the top.

To this end, the controller 110 may provide image data converted into data of an outside mirror view type deriving from image data photographed and obtained by the outside left camera 121 and the outside right camera 132 to the outside left display 141 and the outside right display 142, respectively (e.g., see FIG. 4). In addition, the controller 110 may provide the image (i.e., the left image, the right image, the front image, and the rear image) data for all directions of the vehicle as if the driver looks down the vehicle from the top to the head unit display 145 by performing an image synthesis based on image data photographed and obtained by the top view left camera 121, the top view right camera 122, the top view front camera 123, and the top view rear camera 124. The driver may select the head unit display 145 and may drive the vehicle while monitoring the images of all portions or selected portions among the images (i.e., the left image, the right image, the front image, and the rear image) for all directions of the vehicle using the head unit display 145.

Particularly, in the system 100 for providing image information around a vehicle according to embodiments of the present disclosure, in order to secure convenience and safety of the driving of the vehicle by providing the image information for monitoring the surroundings of the vehicle to the driver in situations in which the vehicle is driven and parked, when some of the components of the system such as the outside cameras 131 and 132, the outside displays 141 and 142, and the like fail, other cameras and displays which are normally operated are utilized, thereby making it possible to maintain a monitoring function. Further, in order to solve a problem that an amount of viewed ground may not be secured because the outside cameras 131 and 132 (e.g., the e-mirror camera) use a narrow angle lens for image quality and a sense of distance, the outside cameras 131 and 132 (e.g., the e-mirror camera) for the image quality and the sense of distance and the top view cameras 121, 122, 123, and 124 (e.g., an AVM camera) for a wide angle image are integrated, thereby making it possible to secure excellent image quality and an increased amount of viewed ground. In addition, the side rear portion, which is the vulnerable portion of the quality image of the top views of the top view cameras 121, 122, 123, and 124 (e.g., the AVM cameras), is replaced with the image of the outside cameras 131 and 132 (e.g., the e-mirror camera), thereby making it possible to improve the image quality of the corresponding region.

That is, the controller 110 may provide the image deriving from the top view left and right cameras 121 and 122 instead of the corresponding failure camera at the time of the failure of the outside cameras 131 and 132, and may provide the image to the head unit display 145 instead of the corresponding failure display at the time of the failure of the outside displays 141 and 142. Further, at the time of the failure of the controller 110, the outside displays 141 and 142 may directly receive and provide the image from the outside cameras 131 and 132.

Hereinafter, a method for providing an image around a vehicle using the outside displays 141 and 142 and the head unit display 145 when the failure of the controller 110, the outside cameras 131 and 132, the outside displays 141 and 142, and the like occurs will be described in detail.

FIG. 4 illustrates embodiments of a display state depending on whether or not the controller 110, the cameras 131 and 132, or the displays 141 and 142 of FIG. 1 fail. The above-mentioned examples are similarly applied to the driving or a reverse of the vehicle.

As shown in FIG. 4, first, in the case in which the controller 110 fails, since the controller 110 does not provide the image to the displays 141, 142, and 145, the outside left display 141 and the outside right display 142 each directly receive image data from the outside left camera 131 and the outside right camera 132 and display the image. To this end, the outside left display 141 and the outside right display 142 may continuously diagnose an image data output of the controller 110, and may determine that the controller 110 fails in the case in which there is no image data output from the controller 110.

Further, the controller 110 may provide image data deriving from a camera or cameras of the corresponding failure direction among the top view left camera 121 and the top view right camera 122 to a display or displays corresponding to the failure direction of the corresponding camera of the outside left display 141 and the outside right display 142, depending on a failure occurrence of any of the outside left camera 131 and the outside right camera 132.

To this end, in the case in which there is no image data output from the outside left camera 131 and the outside right camera 132, the controller 110 may determine that the corresponding camera fails. For example, the controller 110 provides the image data deriving from the top view left camera 121 to the outside left display 141 when the outside left camera 131 fails, and also provides the image data deriving from the top view right camera 122 to the outside right display 142 when the outside right camera 132 fails, thereby making it possible to assist the monitoring of the driver. In addition, when both the outside left camera 131 and the outside right camera 132 fail, the controller 110 may provide the image data deriving from the top view left camera 121 and the top view right camera 122 to the outside left display 141 and the outside right display 142, respectively.

Further, the controller 110 may provide image data deriving from one or more cameras of a failure direction of the corresponding display among the outside left camera 131 and the outside right camera 132 to the head unit display 145, depending on a failure occurrence of any one or more of the outside left display 141 and the outside right display 142.

To this end, in the case in which the controller 110 receives a predetermined diagnosis signal (e.g., a message such as no power, other board defects, or the like) from the outside left display 141 and the outside right display 142, the controller 110 may determine that the corresponding display fails. For example, when the outside left display 141 fails, the controller 110 provides image data deriving from the outside left camera 131 to the head unit display 145, thereby making it possible to display the image data on a left division screen. Further, when the outside right display 142 fails, the controller 110 provides image data deriving from the outside right camera 132 to the head unit display 145, thereby making it possible to display the image data on a right division screen. In addition, when both the outside left display 141 and the outside right display 142 fail, the controller 110 may each provide the image data deriving from the outside left camera 131 and the outside right camera 132 to the head unit display 145, thereby making it possible to display the image data on the left and right division screens.

Hereinafter, the case in which any one or more of the outside cameras 131 and 132 fail and any one or more of the outside displays 141 and 142 fail at the same time will be described with reference to FIGS. 4 to 5D.

FIGS. 5A to 5D illustrate embodiments of a display state depending on a failure occurrence of any one or more of the outside cameras 131 and 132 of FIG. 1 and any one or more of the outside displays 141 and 142 of FIG. 1.

Figure 5A:
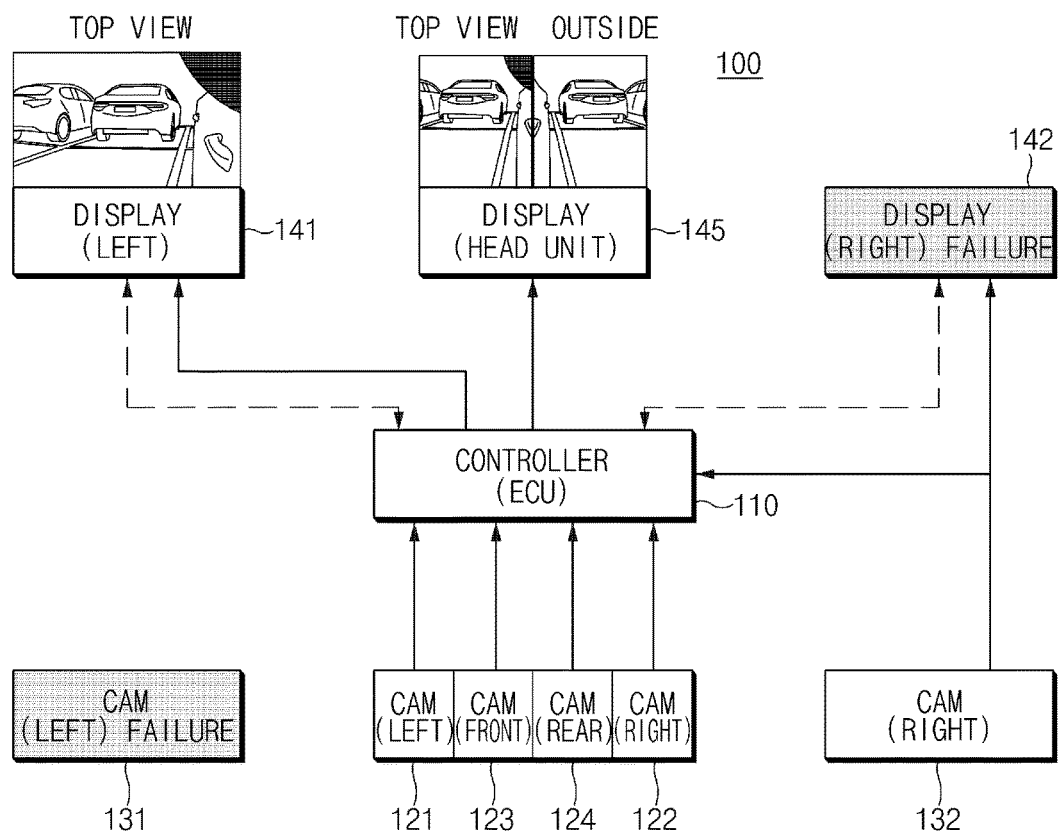
FIGS. 5A to 5D illustrate embodiments of a display state depending on a failure occurrence of any one or more of the outside cameras of FIG. 1 and any one or more of outside displays of FIG. 1.
Figure 5B:
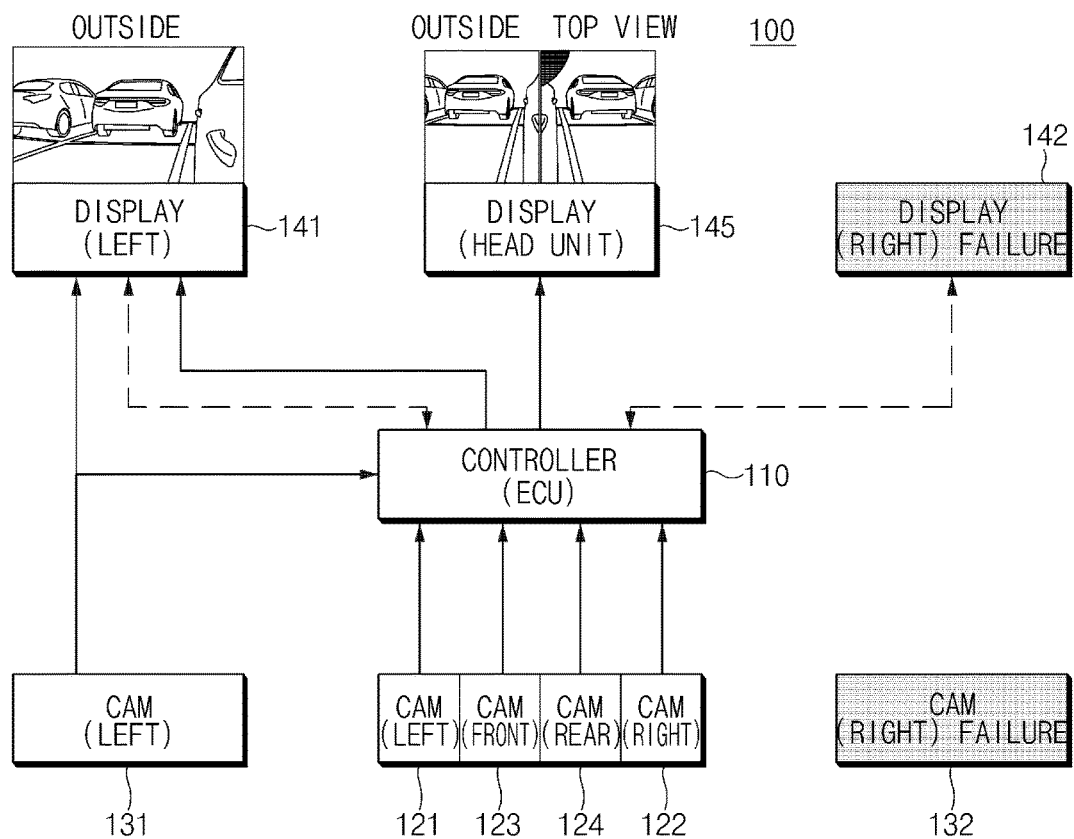
Figure 5C:
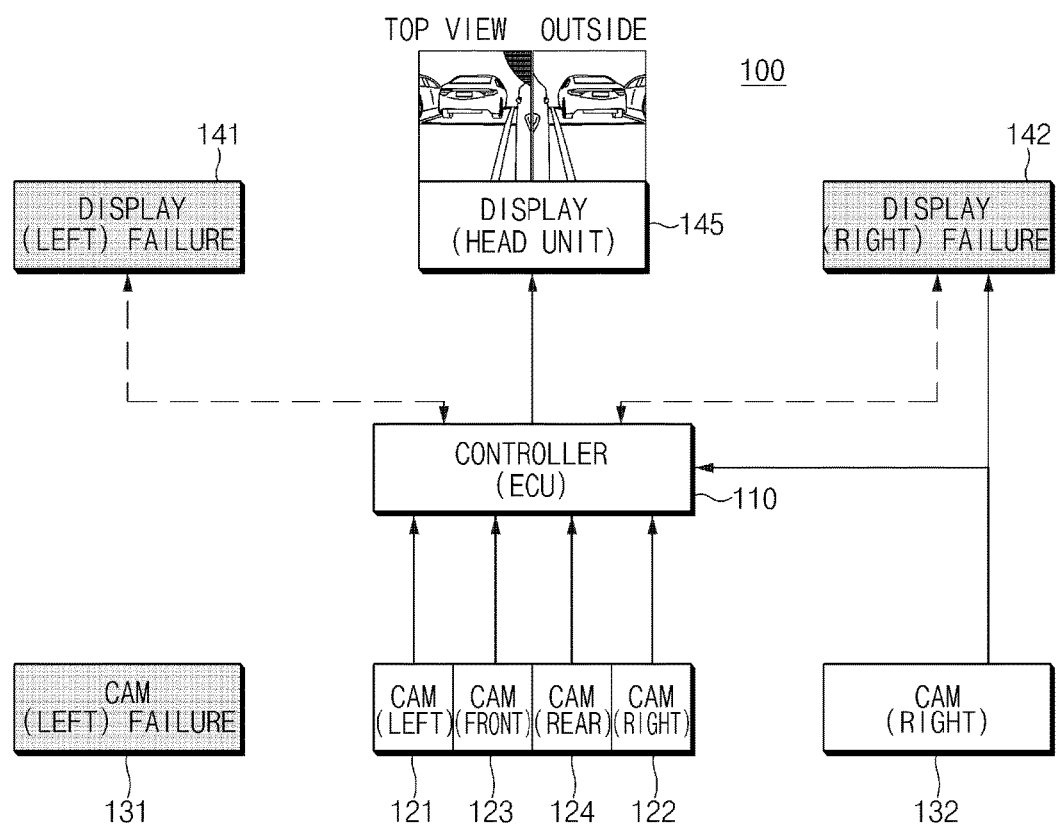

First, in the case in which any one of the outside left camera 131 and the outside right camera 132, and any one of the outside left display 141 and the outside right display 142 fail (e.g., see FIGS. 5A and 5B), the controller 110 may provide image data deriving from normally functioning outside cameras (e.g., 132 of FIG. 5A and 131 of FIG. 5B) to the corresponding normally functioning display (e.g., 141 of FIG. 5B) of the outside left display 141 and the outside right display 142, or may provide the image data deriving from the normally functioning outside cameras to a division screen of the corresponding direction of the head unit display 145 when there is no the corresponding normally functioning display (e.g., see FIG. 5A). Here, when the outside display 141 or 142 corresponding to the outside camera 131 or 132 in which the failure occurs is normally functioning, the controller 110 may provide the image data deriving from the corresponding top view cameras 121 and 122 to the corresponding normally functioning outside display (e.g., 141 of FIG. 5A) as described above.

Figure 5D:
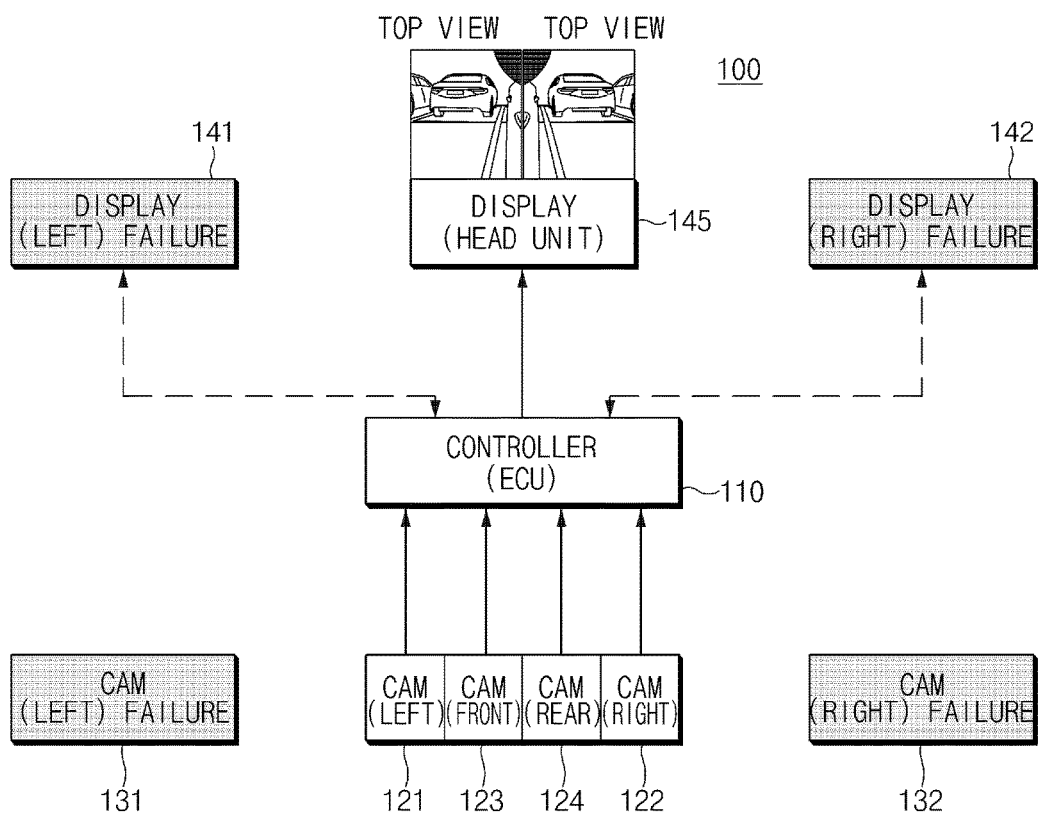

In addition, when both the outside left camera 131 and the outside right camera 132 fail, the controller 110 may provide the image data deriving from the top view left camera 121 and the top view right camera 122 to the corresponding normally functioning display of the outside left display 141 and the outside right display 142, or may provide the image data deriving from the top view left camera 121 and the top view right camera 122 to a division screen of the corresponding direction of the head unit display 145 when there is no corresponding normally functioning display (e.g., see FIG. 5D).

In addition, when both the outside left display 141 and the outside right display 142 fail, the controller 110 may provide the image data deriving from the normally functioning outside camera (e.g., 132 of FIG. 5C) to a division screen of the corresponding direction of the head unit display 145, or may provide the image data deriving from the top view left camera 121 and the top view right camera 122 to the division screen of the corresponding direction of the head unit display 145 when there is no normally functioning outside camera.

Figure 6:
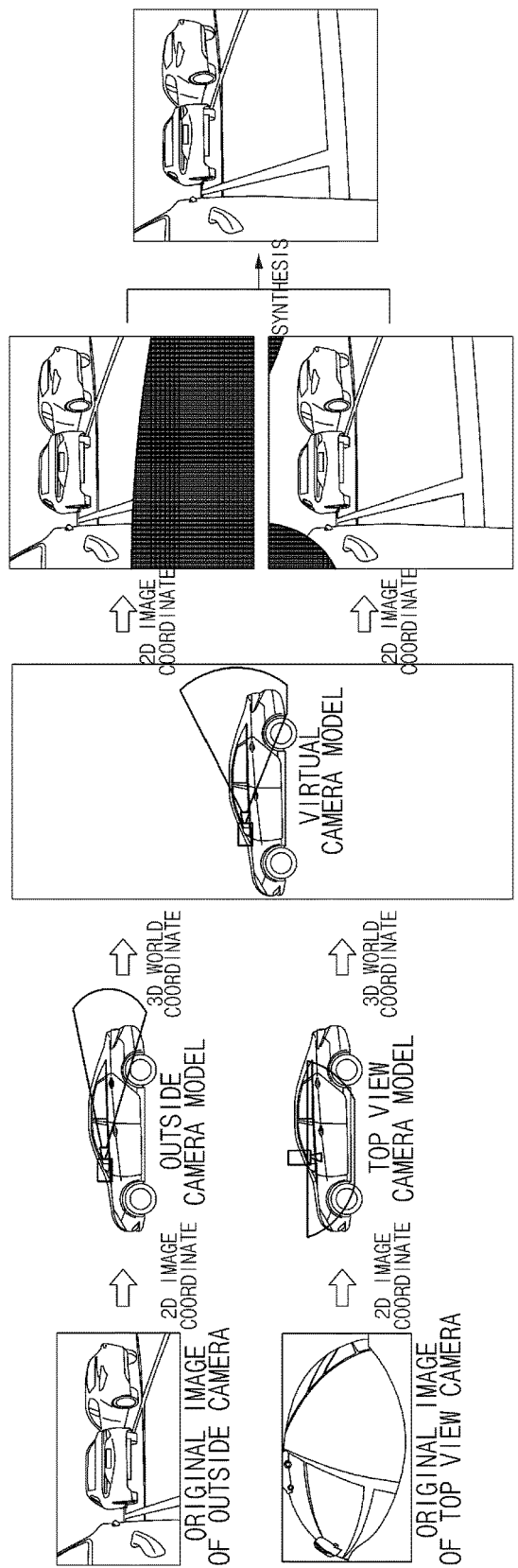
FIG. 6 is a view illustrating a process of providing a view having an increased amount of viewed ground to outside left and right displays by the controller of FIG. 1.

FIG. 6 is a view illustrating a process of providing a view having an increased amount of viewed ground to the outside left and right displays 141 and 142 by the controller 110 of FIG. 1.

The controller 110 may provide the view (or the image) having the increased amount of viewed ground to the outside left display 141 and the outside right display 142, respectively, as described above. That is, the controller 110 may synthesize the image of the outside left camera 131 and the image of the top view left camera 121 to provide the view having the increased amount of viewed ground to the outside left display 141, and may synthesize the image of the outside right camera 132 and the image of the top view right camera 122 to provide the view having the increased amount of viewed ground to the outside right display 142.

For example, as illustrated in FIG. 6, the controller 110 first converts an original image of the narrow angle outside cameras 131 and 132 having excellent image quality and an excellent sense of distance and an original image of the wide angle top view cameras 121 and 122 having the increased amount of viewed ground, from a two-dimensional (2D) coordinate system image to a three-dimensional (3D) world coordinate system image, according to the respective camera modeling algorithms (e.g., an e-mirror camera model, an AVM camera model). The controller 110 may perform a conversion such as magnification/reduction of the images using camera parameters by using a predetermined virtual camera modeling algorithm, may generate the 2D coordinate system image, and may provide a synthesized image in which the image having the increased amount of viewed ground of the top view left camera 121 is reflected to the images of the outside cameras 131 and 132 to the outside displays 141 and 142 by connecting the same image portions to each other and synthesizing the same image portions to form a continuous image.

Figure 7:
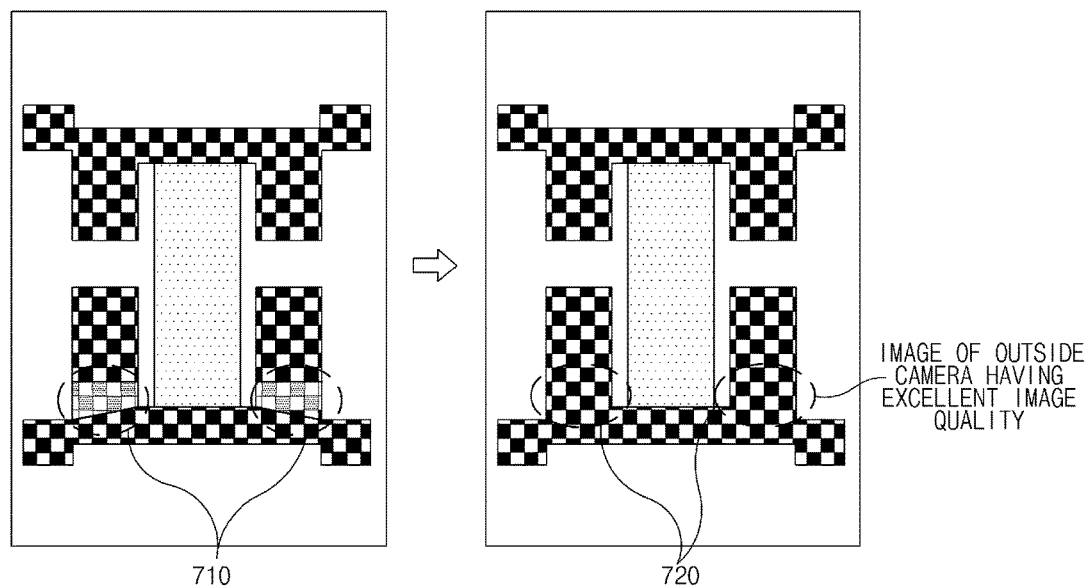
FIG. 7 is a view illustrating a process of providing an image having improved image quality for a rear region of the vehicle to the head unit display by the controller of FIG. 1.

FIG. 7 is a view illustrating a process of providing an image having improved image quality for a rear region of the vehicle to the head unit display 145 by the controller 110 of FIG. 1.

As illustrated in FIG. 7, the controller 110 provides the images for all directions deriving from the top view left camera 121, the top view right camera 122, the top view front camera 123, and the top view rear camera 124 to the head unit display 145. Since image quality deterioration exists in the images of the rear regions of the vehicle of the top view left camera 121, the top view right camera 122, and the top view rear camera 124 as denoted by reference numeral of 710, the controller 110 may replace the image of the corresponding portions with the images deriving from the outside left camera 131 and the outside right camera 132 having excellent image quality. For example, the controller 110 may extract the image corresponding to the same portion as the replacement target region 710 among the images photographed by the top view left camera 121, the top view right camera 122, and the top view rear camera 124 from the images deriving from the outside left camera 131 and the outside right camera 132 using the camera modeling algorithms, or the like, and may replace the corresponding portion with the extracted image.

As described above, in the system 100 for providing image information around a vehicle according to embodiments of the present disclosure, in order to secure convenience and safety of the driving by providing the image information for monitoring the surroundings of the vehicle to the driver in situations in which the vehicle is driven and parked, when some of the components of the system such as the outside cameras 131 and 132, the outside displays 141 and 142, and the like fail, other cameras and displays which are normally operated (or normally functioning) are utilized, thereby making it possible to maintain a monitoring function. Further, in order to solve a problem that the amount of viewed ground may not be secured because the outside cameras 131 and 132 (e.g., the e-mirror camera) use the narrow angle lens for image quality and the sense of distance, the outside cameras 131 and 132 (e.g., the e-mirror camera) for the image quality and the sense of distance and the top view cameras 121, 122, 123, and 124 (e.g., the AVM camera) for the wide angle image are integrated, thereby making it possible to secure the excellent image quality and the increased amount of viewed ground. In addition, the side rear portion, which is the vulnerable portion of the quality image of the top views of the top view cameras 121, 122, 123, and 124 (e.g., the AVM cameras), is replaced with the image of the outside cameras 131 and 132 (e.g., the e-mirror camera), thereby making it possible to improve the image quality of the corresponding region.

As described above, according to embodiments of the present disclosure, the system and the method for providing image information around a vehicle provide the image information for monitoring the surroundings of the vehicle to the driver in situations in which the vehicle is driven and parked, thereby making it possible to secure convenience and safety of the driving of the vehicle. Further, when some of the components of the system fail, other cameras and displays which are normally operated are utilized, thereby making it possible to maintain the monitoring function. Further, in order to solve the problem that the amount of viewed ground may not be secured because the narrow angle camera (e.g., the e-mirror camera) uses the narrow angle lens for the image quality and the sense of distance, the narrow angle camera (e.g., the e-mirror camera) for the image quality and the sense of distance and the AVM camera for the wide angle image are integrated, thereby making it possible to secure the excellent image quality and the increased amount of viewed ground. Further, the side rear portion, which is the vulnerable portion of the quality image of the top view of the AVM camera, is replaced with the image of the narrow angle camera (e.g., the e-mirror camera), thereby making it possible to improve the image quality of the corresponding region.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for providing image information around a vehicle, the system comprising:
    an outside left camera and an outside right camera configured to photograph narrow angle images of rear sides of the vehicle from a left outside position and a right outside position of the vehicle, respectively;
    a top view left camera, a top view right camera, a top view front camera, and a top view rear camera configured to photograph wide angle images of an outside area of the vehicle including a ground from a front position, a rear position, a left position, and a right position outside of the vehicle, respectively;

an outside left display and an outside right display installed at a left position and a right position, respectively, around a dash board inside of the vehicle, and a head unit display installed at a head unit inside of the vehicle; and a controller configured to provide image data deriving from the outside left camera and the outside right camera to the outside left display and the outside right display, respectively, and to provide image data deriving from the top view left camera, the top view right camera, the top view front camera, and the top view rear camera to the head unit display, wherein the controller is further configured to provide images of all available directions deriving from the top view left camera, the top view right camera, the top view front camera, and the top view rear camera to the head unit display, and to perform an image synthesis so that a predetermined rear region of the vehicle among the images of all available directions is replaced with images deriving from the outside left camera and the outside right camera.

2. The system according to claim 1, wherein the outside left display and the outside right display directly receive the image data from the outside left camera and the outside right camera, respectively, depending on a failure occurrence of the controller.

3. The system according to claim 1, wherein the controller is further configured provide image data deriving from one or more cameras of a failure direction among the top view left camera and the top view right camera to one or more displays corresponding to the one or more cameras of the failure direction among the outside left display and the outside right display, depending on a failure occurrence of any of the outside left camera and the outside right camera.

4. The system according to claim 1, wherein the controller is further configured to provide image data deriving from one or more cameras of a failure direction of a corresponding display among the outside left camera and the outside right camera to the head unit display, depending on a failure occurrence of any of the outside left display and the outside right display.

5. The system according to claim 1, wherein when any one of the outside left camera and the outside right camera fail, and any one of the outside left display and the outside right display fail, the controller is further configured to provide image data deriving from a normally functioning outside camera to the corresponding normally functioning display of the outside left display and the outside right display, or provide the image data deriving from the normally functioning outside camera to the head unit display when there is no corresponding normally functioning display.

6. The system according to claim 1, wherein when both of the outside left camera and the outside right camera fail, the controller is further configured to provide image data deriving from the top view left camera and the top view right camera to the corresponding normally functioning display of the outside left display and the outside right display, or provide the image data deriving from the top view left camera and the top view right camera to the head unit display when there is no corresponding normally functioning display.

7. The system according to claim 1, wherein when both of the outside left display and the outside right display fail, the controller is further configured to provide image data deriving from a normally functioning outside camera to the head unit display, or provide image data deriving from the top view left camera and the top view right camera to the head unit display when there is no normally functioning outside camera.

8. The system according to claim 1, wherein the controller is further configured to provide a view having an increased amount of viewed ground obtained by synthesizing an image of the outside left camera and an image of the top view left camera and provide a view having an increased amount of viewed ground obtained by synthesizing an image of the outside right camera and an image of the top view right camera, to the outside left display and the outside right display, respectively.

9. A method for providing image information around a vehicle, the method comprising:

photographing, by an outside left camera and an outside right camera, narrow angle images of rear sides of the vehicle from a left outside position and a right outside position of the vehicle;

photographing, by a top view left camera, top view right camera, wide angle images of a top view front camera, and a top view rear camera, an outside area of the vehicle including a ground from a front position, a rear position, a left position, and a right position outside of the vehicle, respectively;

providing, by a controller, image data deriving from the outside left camera and the outside right camera to an outside left display and an outside right display, respectively, installed at a left position and a right position, respectively, around a dash board inside of the vehicle;

providing, by the controller, image data deriving from the top view left camera, the top view right camera, the top view front camera, and the top view rear camera to a head unit display installed at a head unit inside of the vehicle;

providing, by the controller, images of all available directions deriving from the top view left camera, the top view right camera, the top view front camera, and the top view rear camera to the head unit display; and performing, by the controller, an image synthesis so that a predetermined rear region of the vehicle among the images of all available directions is replaced with images deriving from the outside left camera and the outside right camera.

10. The method according to claim 9, further comprising directly receiving, by the outside left display and the outside right display, the image data from the outside left camera and the outside right camera, respectively, depending on a failure occurrence of the controller.

11. The method according to claim 9, further comprising providing, by the controller, image data deriving from one or more cameras of a failure direction among the top view left camera and the top view right camera to one or more displays corresponding to the one or more cameras of the failure direction among the outside left display and the outside right display, depending on a failure occurrence of any of the outside left camera and the outside right camera.

12. The method according to claim 9, further comprising providing, by the controller, image data deriving from one or more cameras of a failure direction of a corresponding display among the outside left camera and the outside right camera to the head unit display, depending on a failure occurrence of any of the outside left display and the outside right display.

13. The method according to claim 9, further comprising, when any one of the outside left camera and the outside right camera fail, and any one of the outside left display and the outside right display fail, providing, by the controller, image data deriving from a normally functioning outside camera to the corresponding normally functioning display of the outside left display and the outside right display, or providing, by the controller, the image data deriving from the normally functioning outside camera to the head unit display when there is no corresponding normally functioning display.

14. The method according to claim 9, further comprising, when both of the outside left camera and the outside right camera fail, providing, by the controller, image data deriving from the top view left camera and the top view right camera to the corresponding normally functioning display of the outside left display and the outside right display, or providing, by the controller, the image data deriving from the top view left camera and the top view right camera to the head unit display when there is no corresponding normally functioning display.

15. The method according to claim 9, further comprising, when both of the outside left display and the outside right display fail, providing, by the controller, image data deriving from a normally functioning outside camera to the head unit display, or providing, by the controller, image data deriving from the top view left camera and the top view right camera to the head unit display when there is no normally functioning outside camera.

16. The method according to claim 9, further comprising providing, by the controller, a view having an increased amount of viewed ground obtained by synthesizing an image of the outside left camera and an image of the top view left camera and a view having an increased amount of viewed ground obtained by synthesizing an image of the outside right camera and an image of the top view right camera, to the outside left display and the outside right display, respectively.

17. A non-transitory computer readable medium containing program instructions for providing image information around a vehicle, the computer readable medium comprising program instructions that:
provide image data deriving from an outside left camera and an outside right camera to an outside left display and an outside right display, respectively, installed at a left position and a right position, respectively, around a dash board inside of the vehicle;
provide image data deriving from a top view left camera, a top view right camera, a top view front camera, and a top view rear camera to a head unit display installed at a head unit inside of the vehicle;
provide image data of all available directions deriving from the top view left camera, the top view right camera, the top view front camera, and the top view rear camera to the head unit display; and
perform an image synthesis so that a predetermined rear region of the vehicle among the image data of all available directions is replaced with images deriving from the outside left camera and the outside right camera, wherein
the outside left camera and the outside right camera are configured to photograph narrow angle images of rear sides of the vehicle from a left outside position and a right outside position of the vehicle, respectively, and
the top view left camera, the top view right camera, the top view front camera, and the top view rear camera are configured to photograph wide angle images of an outside area of the vehicle including a ground from a front position, a rear position, a left position, and a right position outside of the vehicle, respectively.

* * * * *